Sept. 21, 1965  R. H. A. SCHOONOVER  3,207,497
TORSION SPRING ASSEMBLY

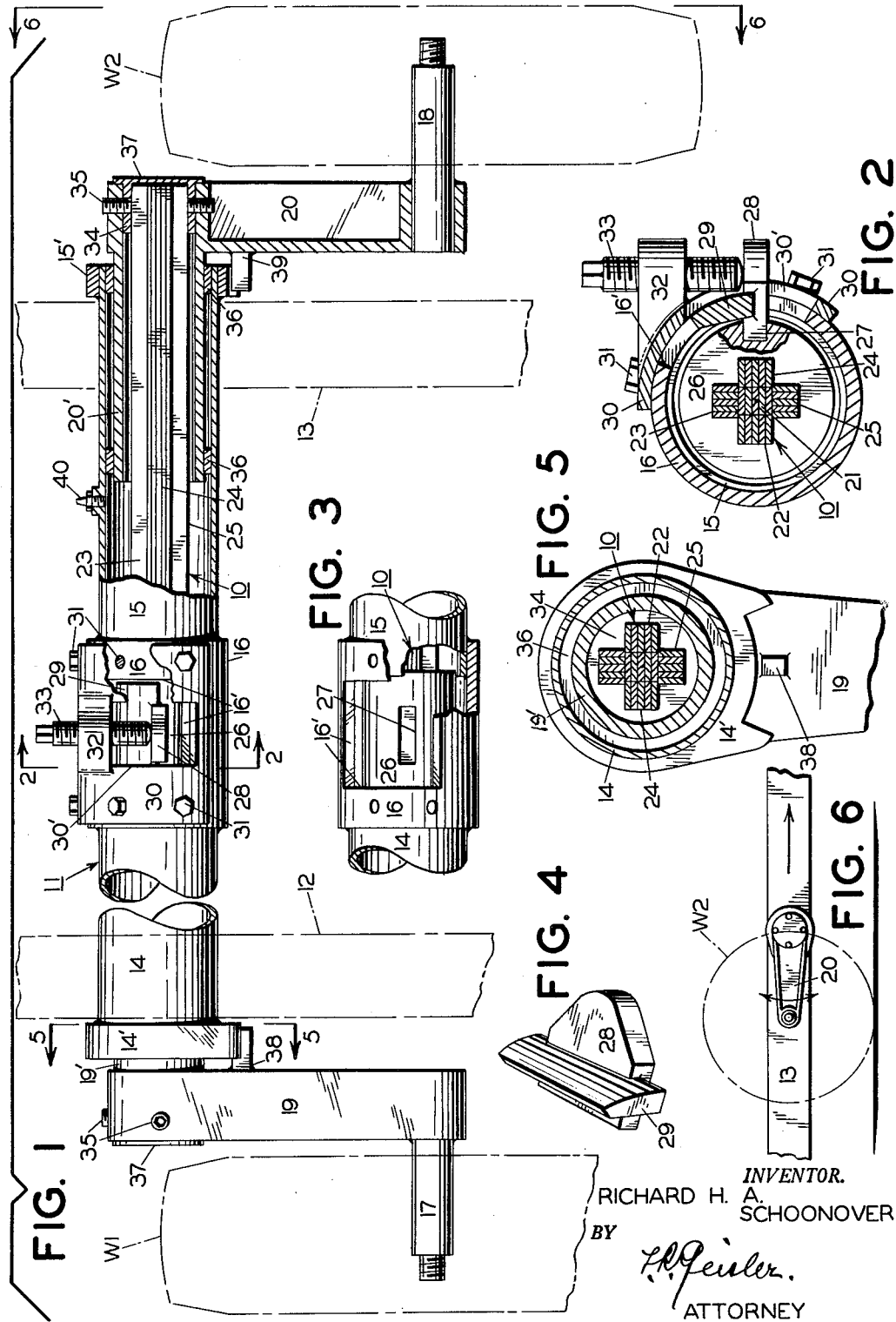

Filed July 2, 1963  2 Sheets-Sheet 2

INVENTOR.
RICHARD H. A. SCHOONOVER
BY
ATTORNEY

United States Patent Office 3,207,497
Patented Sept. 21, 1965

3,207,497
TORSION SPRING ASSEMBLY
Richard H. A. Schoonover, Oswego, Oreg., assignor, by mesne assignments, to Dura Corporation, Oak Park, Mich., a corporation of Michigan
Filed July 2, 1963, Ser. No. 292,282
3 Claims. (Cl. 267—57)

This invention relates in general to torsion spring assemblies in which one end of the torsion spring assembly is secured against rotation and the other end is connected to torque applying means, and more specifically, to a torque arm which swings through a considerable arc, or in which the torsion spring assembly is held against rotation at its longitudinally central portion while such torque arms are connected to the opposite ends respectively.

This invention is concerned particularly with torsion spring assemblies suitable for wheel suspension for vehicles, and the invention relates still more specifically to torsion spring assemblies which are composed of a plurality of identical spring leaves which combine to provide such an assembly suitable for employment in vehicle wheel suspensions, as well as for other purposes.

A principal object of the invention is to provide an improved composite torsion spring assembly which will accommodate a maximum amount of twist with a minimum length of the torsion spring assembly.

A related object is to provide an improved torsion spring assembly, suitable for employment with vehicle wheel suspension, which will be small and compact in size while being capable of withstanding the twisting load imposed by the wheel-carrying arms on a vehicle.

It is well-known that a composite torsion bar composed of a plurality of leaves or strips will accommodate a greater amount of twist for a given length than a solid bar of the same length and overall cross sectional dimension. Also it is well-known that with torsional spring elements the greatest strain or stretch occurs along the lateral or outer edges and that consequently the fatiguing of such elements takes place at such places. Furthermore when a torsion spring element is subjected to bending in a lateral direction, in addition to being subjected to twisting, an increased edge stretching strain is imposed. A further and important object of this invention accordingly is to provide an improved torsion spring assembly, composed of a plurality of torsion elements each of which contributes to the composite torsion spring action but in which each of the elements will be subjected to torsional twist without also being subjected to excessive lateral bending.

An additional object is to provide an improved torsion spring assembly, composed of a plurality of identical torsion spring members, in which the members, while acting individually as well as collectively, will always be maintained in their relative positions with respect to each other and in which the holding of the separate members together, and the separate groups of elements together, will not present any difficulty.

The manner in which these objects and other advantages are attained with the spring assembly of the present invention, and the manner in which the assembly is constructed, mounted and caused to function, will be briefly described and explained with reference to the accompanying drawings which illustrate the invention employed with a pair of rocking levers, or wheel-supporting arms, carrying wheel axles for a pair of track wheels at opposite sides of a Caterpillar track vehicle.

In the drawings:

FIG. 1 is a foreshortened plan view, partly in section, of the vehicle spring suspension embodying the present invention, with the pair of wheels at opposite sides respectively and with portion of two main frame members of the vehicle being indicated by broken lines;

FIG. 2 is a section on line 2—2 of FIG. 1 drawn to a slightly larger scale;

FIG. 3 is a fragmentary plan view, corresponding in part to FIG. 1, but with the cap and the adjustable locking plate at the center portion of the assembly removed, and with a portion of the housing for the center locking ring broken away;

FIG. 4 is a perspective view showing the adjustable locking plate by itself drawn to a slightly larger scale;

FIG. 5 is a section on line 5—5 of FIG. 1 drawn to the same scale as FIG. 2;

FIG. 6 is a diagrammatic side elevation of one of the wheel-carrying arms taken on line 6—6 of FIG. 1 but drawn to a much smaller scale with the vehicle wheel indicated by broken lines;

Figure 7:
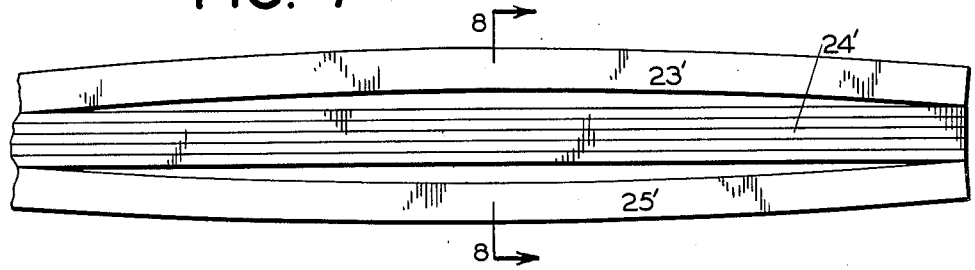
FIG. 7 is a fragmentary elevation of portion of a slightly modified form in which the spring assembly itself may be made before being secured in place in the housing.

Referring first to FIG. 1, the torsion spring, indicated as a whole by the reference character 10, is mounted in a composite tubular housing 11, which extends transversely of the vehicle frame and which is rigidly secured near its opposite ends respectively to the longitudinally-extending main frame members indicated by the broken lines 12 and 13 (the housing 11 being secured to these main frame members 12 and 13 by suitable means not shown).

The housing 11 is composed of a pair of co-axial tubes 14 and 15, the inner ends of which are rigidly secured, for example by welding, within the corresponding ends of a central cylindrical housing member 16. The wall of the central cylindrical housing member 16 is provided with a rectangular opening 16' (see also FIGS. 2 and 3) for a reason which will be apparent later.

The axles 17 and 18 for the wheels W1 and W2 on opposite sides of the vehicle are mounted in a pair of trailing wheel-carrying arms 19 and 20 respectively. Each of these arms has an integral tubular journal portion 19' and 20' respectively adapted to be rotatably mounted in the outer ends of the tube members 14 and 15 respectively of the composite housing 11.

The torsion spring 10 is a composite member formed of a plurality of identical groups (for example five in the particular spring illustrated) of identical flat torsion elements or leaves, with the identical elements of each group arranged in nested or superimposed arrangement. Thus, referring to FIG. 2, the composite torsion spring 10 consists of a central or core group 21, containing individual identical spring leaves or torsion elements, and four similar groups of identical spring elements 22, 23, 24 and 25 extending longitudinally along on the periphery of the core group. However it will be noted from FIG. 2 (and likewise from FIG. 5) that the surrounding groups of spring elements 22, 23, 24 and 25 normally extend in planes that, as closely as possible, are positioned radially with respect to the center axis of the composite spring assembly. This is a very important feature of the invention and will be referred to again later.

The five groups of spring leaves or elements extend through channels provided in a central locking ring 26 (see FIGS. 1 and 3 in addition to FIG. 2), which locking ring is mounted in the central cylindrical housing member 16 (and the five groups also extend through similar channels in end locking rings mentioned presently). As apparent from FIG. 2, the central locking ring holds the various groups 21, 22, 23, 24 and 25 together and maintains each one of the surrounding groups in its proper relative position with respect to the others (this being true of the end locking rings also). In addition, the central locking ring, by being provided with means for locking the ring against rotation in the central cylindrical housing member 16, holds the central portion of the composite torrsion spring 10 against rotation and thus in effect provides a pair of composite torsion spring elements extending from the central locking ring 26 and housing member 16 to the trailing wheel-carrying arms 19 and 20 respectively.

The central locking ring 26 is provided with a substantially horizontal slot 27 (FIGS. 2 and 3) which serves as a seat for the inwardly-extending edge portion of an adjustable locking plate 28. This locking plate 28 extends through the window opening 16' (FIGS. 2 and 3) in the stationary central housing member 16, and carries an upper curved, longitudinally-extending guide bar 29, which is longer than the plate 28, which is also accommodated in the window opening 16'.

A substantially semi-cylindrical cap 30 (FIGS. 1 and 2) is removably mounted on the central housing member 16 by suitable screws 31. This cap is also provided with a rectangular window 30' of smaller dimension than the window 16', and the cap extends over the side portions of the window 16' for a short distance. The length of the guide bar 29 for the locking plate 28 is substantially the same as the length of the inner window opening 16' and thus the ends of this guide bar extend under the overlying side edges of the cap 30 on the sides of the outer window opening 30'. In this way the cap 30, when secured in place on the stationary cylindrical housing member 16, prevents the locking plate 28 from dropping out of place in the central locking ring 26. The cap 30 is provided with an integral outwardly-extending bracket 32 (FIGS. 1 and 2) located at the top of the window opening 30', which carries an adjustable set screw 33. The bottom end of this set screw bears against the locking plate 28 and holds the locking plate, and therewith the locking ring 26 and the central portion of the composite torsion spring 10, against rotation (in counter-clockwise direction as viewed in FIG. 2), and thus in opposition to the rotational torque imposed at the ends of the composite torsion spring by the wheel-carrying arms 19 and 20.

Furthermore, by adjustment of the set screw 33, as apparent, it is possible to give a partial rotation to the locking ring 26 and therewith to the central portion of the composite torsion spring in the opposite direction (clockwise as viewed in FIG. 2) so as to adjust the tension of the torsion spring with respect to the turning torque produced by the wheel-carrying arms 19 and 20.

An end locking ring 34 (FIGS. 1 and 5) for each outer end of the composite torsion spring 10 is secured in each of the tubular journal portions 19' and 20' of the wheel-carrying arms 19 and 20, being firmly secured therein by suitable holding screws 35. As shown in FIG. 5, these end rings 34 are provided with channels for the groups of elements making up the composite torson spring 10 in the same way as the central locking ring 26, and, like the central locking ring, these end locking rings maintain the groups of elements in proper relative position with respect to each other, causing all the groups and all the spring elements in the groups to cooperate and function properly in providing spring resistance to twisting loads imposed at the ends of the composite torsion spring.

Suitable bearing rings 36 (FIG. 1) are provided for the tubular journal portions 19' and 20' of the wheel-carrying arms within the corresponding housing tubes 14 and 15, and a suitable dust cap 37 extends over the outer face of each of the tubular journal portions 19' and 20'. The composite stationary tubular housing 11 for the composite torsion spring is provided with suitable grease nipples, one of these being indicated at 40 in FIG. 1.

In order to provide positive limits to the up and down swing of the wheel-carrying arms 19 and 20, stop rings 14' and 15' are welded to the ends of the housing tubes 14 and 15 respectively, and these rings have limit stops adapted to engage lugs 38 and 39 secured on the wheel-carrying arms 19 and 20 respectively.

It will now be apparent, with reference to FIGS. 2 and 5, that the torsional strain at either end of the composite torsion spring, causing partial rotation of an end locking ring 34 while the central locking ring 26 is held against rotation, will produce a torsional twist in each group of spring elements and in each element thereof, but will not result in any appreciable lateral bending of any of the spring elements, such lateral bending being distinct from rotational twisting. However if, for example, the two groups of spring elements 23 and 25 (with reference to FIGS. 2 and 5) were so arranged that the elements in these groups were parallel to the elements in the central or core group 21 instead of being perpendicular thereto, then, as will be evident, partial rotation of an end locking ring 34, with the central locking ring 26 being held against rotation, would subject the top spring element in group 23 and the bottom spring element in group 25 (as viewed in these two figures) to considerable undesirable lateral bending in addition to torsional twist. Such a condition would result in quick fatiguing of these elements.

Thus to avoid any appreciable lateral bending of any of the elements I have found it to be necessary to arrange the groups of spring elements in such a way that the peripheral groups of elements in this composite spring assembly (thus the groups 22, 23, 24 and 25) will be positioned so as to extend as nearly as possible in radial directions will respect to the axis of rotation of the entire assembly. As previously mentioned, this is an important feature of the invention.

It would of course be possible to have more than four groups or less than four groups of spring members positioned about the center group 21, but I regard the combination of four identical groups about a similar central core group to be the preferred manner of carrying out the invention since I have found such construction to be most simple and practical.

Not only does this combining of several identical groups of spring elements in the manner described enable a large number of identical individual leaves or spring elements to be formed into a composite torsion spring in which each element contributes its spring resistance to torsional twist imposed on the composite spring assembly without danger of being subjected also to any appreciable bending in lateral direction, but the arrangement also enables a number of indivual spring elements or leaves to be combined in a composite torsion spring assembly which is relatively small and compact in size and which will enable a relatively short length of such torsion spring assembly to accommodate a considerable torsional twist.

For example, in the particular vehicle wheel suspension illustrated in FIG. 1 for track wheels in a small Caterpillar track vehicle, such a composite torsion spring bar having an over-all length of nineteen inches (and thus with each longitudinal half portion constituting a torsion spring bar of only about 9½ inches in length), has been found to function satisfactorily with the wheel-carrying arms capable of swinging through arcs of 50°.

Thus a considerable amount of torsional twist can be accommodated by a very short length of this composite torsion spring bar, a much greater amount than I have found possible to obtain satisfactorily with other known types and arrangements of torsion bars of such short lengths.

Further, as previously indicated, the relatively small and compact size of the assembly, and the fact that the maintenance of the various groups of spring-elements in the assembly in their proper relative position presents no problem, are additional advantages of the composite torsion spring assembly of this invention.

In the carrying out of this invention it is also possible to provide for obtaining additional twist by pre-twisting the individual strips or spring members in the direction opposite from the twist which will be imposed on them by the load or wheel-carrying arm. In such case this opposite pre-twist should be sufficient to allow the strips or spring members to come back to substantially straight position under normal load and thus enable them to twist beyond normal load position equally as far or still further, in degrees, in the opposite direction under a heavy load. This opposite pre-twisting prevents excessive stretch on the edge of the individual members (where the greatest stretch takes place) and thus provides for greater possible degrees of twist.

Figure 8:
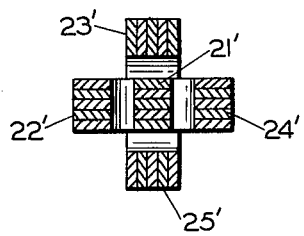
FIG. 8 is a cross section on line 8—8 of FIG. 7.

A further modification for obtaining additional twist in the spring members in carrying out of the invention is illustrated in FIGS. 7 and 8. In this modified form the members in the outer groups 22', 23', 24'. and 25' are bent away from the central core group 21' or bowed so as to cause a curved space to be set up between each outer group and the central core group when the groups are assembled. This would be done only when the spring assembly is set up with the ceneral locking ring or retainer as previously described, and the curves of the outer groups would end at the center and outer ends of the assembly, the retainer at the center and the retainers at the outer ends then tending to hold the outer groups against the central core group. Such curving of the members in the outer groups would make the outer edges of such members longer than the inner edges and thus allow for greater travel of the outer edges, and, as previously mentioned, the outer edges travel further than the inner edges when the assembly is under torsion.

By combining opposite pre-twisting and bowing of the individual members the greatest possible movement could be accommodated satisfactorily and for minimum space where maximum travel or movement will probably be desired such combined pre-twisting and curving of the individual members thus would be most effective. Obviously the amount of curving and the amount of pre-twisting should be governed by the size and number of the individual strips and the amount of travel or movement probably to be expected under maximum load. On the other hand, for light loads or loads where the amount of travel is not too great the employment of straight individual members, as illustrated in FIGS. 1, 2 and 5 will be entirely satisfactory.

I claim:

1. In a torsion spring assembly for a vehicle suspension, a central core extending along the longitudinal axis of the torsion spring assembly, said core consisting of a plurality of identical superimposed flat spring elements, a plurality of groups of superimposed flat spring elements symmetrically positioned about said core, at least one of said flat spring elements in each of said latter mentioned groups extending substantially radially with respect to the axis of the torsion spring assembly, whereby a torsional twist imposed on said spring assembly will cause torsional twist to be imposed on said spring elements in said latter mentioned groups without any appreciable bending of said elements of said latter mentioned groups in a lateral direction, locking means for holding the central portion of said torsion spring assembly against rotation by torsional twists imposed on the ends of said torsion spring assembly, said locking means including a locking ring extending around said torsion spring assembly containing channels for said groups of said elements, adjustable means for partially rotating said locking ring in a direction opposite the direction of torsional twist imposed on said torsion spring assembly for adjusting the tension of said torsion spring assembly, a pair of torsion arm assemblies attached to the ends of said torsion spring assembly respectively, each of said torsion arm assemblies including a locking ring on said torsion spring assembly similar to said first mentioned central locking ring, and a vehicle wheel carried by each of said torsion arm assemblies.

2. A torsion spring assembly for a vehicle wheel suspension including a plurality of identical groups of superimposed flat spring elements, one of said groups constituting a core group extending along the axis of the torsion spring assembly, the other groups symmetrically positioned about said core group, at least one of said flat spring elements in each of said other groups extending substantially radially with respect to the axis of the torsion spring assembly, whereby a torsional twist imposed on said torsion spring assembly will cause torsional twist to be imposed on said spring elements in said other groups without any appreciable bending of said elements of said other groups in a lateral direction, locking means holding the central portion of said torsion spring assembly against rotation by torsion twists imposed on the ends of said torsion spring assembly, said locking means including a locking ring extending around said torsion spring assembly and containing channels for said groups of said elements, a stationary housing assembly secured to the frame of the vehicle for said torsion spring assembly, a central cylindrical housing member in said housing assembly, said locking ring mounted in said housing member, said housing member provided with a window opening, a locking element on said locking ring, said locking element extending out through said window opening, a housing cap secured on said housing member, adjustable holding means carried by said cap and engaging said locking element, a pair of torsion arm assemblies attached to the ends of said torsion spring assembly respectively, each of said torsion arm assemblies including a locking ring on said torsion spring assembly similar to said first mentioned central locking ring, said torsion arm assemblies rotatably supported in the ends of said housing assembly respectively, and a vehicle wheel carried by each of said torsion arm assemblies.

3. A composite torsion spring assembly including a core group of superimposed flat spring elements, and four identical outer groups of superimposed flat spring elements extending along the four sides of said core group respectively, at least one of said flat spring elements in each of said outer groups extending radially with respect to the axis of the entire assembly, said outer groups being formed with a slight outward bow with respect to the adjacent side of said core group, and means holding each of said outer groups pressed against the adjacent side of said core group near each end of the bow of the group.

References Cited by the Examiner

UNITED STATES PATENTS

| | | |
|---|---|---|
| 2,164,096 | 6/39 | Tjaarda. |
| 2,175,562 | 10/39 | Frohlich _____ 267—57 |
| 3,081,991 | 3/63 | Swainson _____ 267—1 |

FOREIGN PATENTS

| | | |
|---|---|---|
| 218,114 | 7/24 | Great Britain. |
| 519,524 | 3/40 | Great Britain. |
| 613,044 | 11/48 | Great Britain. |
| 472,079 | 6/52 | Italy. |
| 1,043,686 | 11/53 | France. |

ARTHUR L. LA POINT, *Primary Examiner.*

EUGENE G. BOTZ, *Examiner.*